United States Patent
Curtin

(10) Patent No.: US 7,727,373 B2
(45) Date of Patent: Jun. 1, 2010

(54) HYDROGEN ABSORPTION ROD

(76) Inventor: Lawrence Curtin, P.O. Box 6009, Hutchinson Island, FL (US) 34957

( * ) Notice: Subject to any disclaimer, the term of this patent is extended or adjusted under 35 U.S.C. 154(b) by 910 days.

(21) Appl. No.: 11/542,951

(22) Filed: Oct. 4, 2006

(65) Prior Publication Data

US 2007/0215485 A1 Sep. 20, 2007

Related U.S. Application Data

(60) Provisional application No. 60/783,638, filed on Mar. 17, 2006.

(51) Int. Cl.
*C25B 9/00* (2006.01)
*C25B 1/04* (2006.01)
*H01M 8/06* (2006.01)

(52) U.S. Cl. .................. 205/340; 205/637; 204/248; 204/275.1

(58) Field of Classification Search .................. None
See application file for complete search history.

(56) References Cited

U.S. PATENT DOCUMENTS

| | | | |
|---|---|---|---|
| 3,256,504 A | 6/1966 | Fidelman |
| 3,374,158 A | 3/1968 | Lord et al. |
| 3,840,454 A | 10/1974 | Jansta et al. |
| 3,917,520 A | 11/1975 | Katz et al. |
| 4,011,149 A | 3/1977 | Nozik |
| 4,021,323 A | 5/1977 | Kilby |
| 4,045,546 A | 8/1977 | Dupont |
| 4,061,555 A | 12/1977 | Miyatani et al. |
| 4,076,904 A | 2/1978 | Chen |
| 4,090,933 A | 5/1978 | Nozik |
| 4,094,751 A | 6/1978 | Nozik |
| 4,107,008 A | 8/1978 | Horvath |
| 4,146,446 A | 3/1979 | von Sturm |
| 4,160,816 A | 7/1979 | Williams et al. |
| 4,203,814 A | 5/1980 | Grantham |
| 4,227,977 A | 10/1980 | Grantham |
| 4,235,693 A | 11/1980 | Rowe et al. |
| 4,235,694 A | 11/1980 | Hall |
| 4,235,863 A | 11/1980 | Schulten et al. |
| 4,236,984 A | 12/1980 | Grantham |
| 4,263,110 A | 4/1981 | Meyerand, Jr. |
| 4,263,111 A | 4/1981 | Hooper et al. |
| 4,265,721 A | 5/1981 | Hackmeyer |
| 4,305,794 A | 12/1981 | Davidson et al. |
| 4,310,405 A | 1/1982 | Heller |
| 4,342,738 A | 8/1982 | Burgund |
| 4,344,831 A | 8/1982 | Weber |
| 4,352,722 A | 10/1982 | Ohkawa |
| 4,371,500 A | 2/1983 | Papineau |
| 4,379,740 A | 4/1983 | Nazzal et al. |

(Continued)

*Primary Examiner*—Harry D Wilkins, III
(74) *Attorney, Agent, or Firm*—Hayworth, Chaney & Thomas P.A.; Robert A. Lynch; Stephen C. Thomas

(57) ABSTRACT

An apparatus and a method for producing, capturing and storing hydrogen in a hydrogen absorption rod. The hydrogen absorption rod comprises a zeolite core material surrounding a conductive rod, wherein the zeolite core material is suitable for releasing captured hydrogen to a hydrogen fuel cell. More specifically, the apparatus and method utilize solar-generated electric current to separate hydrogen from water, whereupon the released hydrogen is captured in the hydrogen absorption rod. The hydrogen absorption rod is configured to allow for ease and safety of transportation, storage, and use of hydrogen gas in hydrogen fuel cells.

20 Claims, 4 Drawing Sheets

U.S. PATENT DOCUMENTS

| | | | |
|---|---|---|---|
| 4,381,978 A | 5/1983 | Gratzel et al. | |
| 4,394,231 A | 7/1983 | Nicolas | |
| 4,394,293 A | 7/1983 | Gratzel et al. | |
| 4,412,895 A | 11/1983 | Lu | |
| 4,414,080 A | 11/1983 | Williams et al. | |
| 4,419,329 A | 12/1983 | Heller | |
| 4,437,963 A | 3/1984 | Yeoman | |
| 4,466,869 A | 8/1984 | Ayers | |
| 4,472,260 A | 9/1984 | Neefe | |
| 4,490,232 A | 12/1984 | Lapeyre | |
| 4,511,450 A | 4/1985 | Neefe | |
| 4,522,695 A | 6/1985 | Neefe | |
| 4,528,252 A | 7/1985 | Yamazaki | |
| 4,565,617 A | 1/1986 | Ahuja | |
| 4,588,577 A | 5/1986 | Cardinal | |
| 4,643,817 A | 2/1987 | Appleby | |
| 4,650,554 A | 3/1987 | Gordon | |
| 4,656,103 A | 4/1987 | Reichman et al. | |
| 4,790,916 A | 12/1988 | Murphy et al. | |
| 5,037,518 A | 8/1991 | Young et al. | |
| 5,059,296 A | 10/1991 | Sherman | |
| 5,089,107 A | 2/1992 | Pacheco | |
| 5,176,809 A | 1/1993 | Simuni | |
| 5,228,964 A | 7/1993 | Middleby | |
| 5,300,276 A | 4/1994 | Ueda et al. | |
| 5,401,371 A | 3/1995 | Oshima et al. | |
| 5,540,831 A | 7/1996 | Klein | |
| 5,632,870 A | 5/1997 | Kucherov | |
| 5,665,211 A | 9/1997 | Leppanen | |
| 5,968,325 A | 10/1999 | Oloman et al. | |
| 6,336,430 B2 | 1/2002 | De Souza et al. | |
| 6,533,919 B1 | 3/2003 | Narayanan | |
| 2002/0005360 A1 | 1/2002 | Haug et al. | |
| 2002/0155330 A1 | 10/2002 | Tanaka | |
| 2004/0009392 A1 | 1/2004 | Petillo et al. | |
| 2004/0217014 A1 * | 11/2004 | Ovshinsky et al. | 205/742 |
| 2005/0183962 A1 * | 8/2005 | Oakes | 205/340 |

* cited by examiner

HYDROGEN ABSORPTION ROD

CROSS-REFERENCE TO RELATED APPLICATIONS

This provisional patent application builds upon previously filed U.S. provisional patent application No. 60/783,638 carrying filing date in the USPTO Mar. 17, 2006, which is specifically incorporated herein by reference in its entirety; and the present patent application also builds upon PCT application number PCT/US2006/015762, which is specifically incorporated herein by reference in its entirety.

BACKGROUND

1. Field of the Invention

The present patent application relates to the field of alternative energy sources, more specifically, an apparatus and method for capturing and storing hydrogen for use in hydrogen fuel cells. Hydrogen is separated from water utilizing a floating apparatus comprising a photovoltaic cell for generating electric current. The hydrogen is then absorbed by an absorption rod comprising a titanium or equivalent core upon which zeolite core material has been grown utilizing methods known in the art. Once a desired amount of hydrogen has been absorbed by zeolite core material of the hydrogen absorption rod, the hydrogen absorption rod is removed from the apparatus and is available for use in a hydrogen fuel cell.

2. Background of the Invention

Hydrogen fuel cells are well known in the art, and have been used for many years in a wide variety of applications. FIG. 1 depicts a schematic diagram exemplary of a typical hydrogen fuel cell. Hydrogen fuel cells are based upon the principle that the recombination of hydrogen and oxygen atoms to form water will result in the generation of an electric current, if the recombination is carried out in an appropriate structure. Exemplary uses of hydrogen fuel cells are the National Aeronautic and Space Administration (NASA) use of such cells to provide power onboard spacecraft and in experimental ground vehicles. Recent research has also focused on the use of hydrogen fuel cells as an alternative power source for use in ground vehicles, specifically automobiles. Constantly increasing fossil fuel costs, and the instability in nations that are the foreign sources of fossil fuels, has driven both the United States government and private industry to investigate, research, refine, and experiment with the use of hydrogen fuel cells as an alternative source of power.

Hydrogen fuel cells are a low-polluting alternative fuel source whose only by-product is pure water, and they therefore represent an attractive alternative to fossil fuels that contribute to the accumulation of harmful greenhouse gasses in the atmosphere, are increasingly expensive, and are not renewable.

Hydrogen fuel cells therefore potentially provide significant benefits over the use of fossil fuels. However, hydrogen fuel cells require gaseous hydrogen as fuel. Gaseous hydrogen is typically stored in pressurized tanks, which are prone to explosion and leaking and therefore require expensive safety precautions during filling, storage, transportation, and use. The cost association with such safety precautions, as well as the inherent danger in handling and storing pressurized hydrogen, currently represent a significant disadvantage in the use of hydrogen cells as an alternative fuel source.

Methods for separating hydrogen from water are also known in the art. Hydrogen is typically separated from water by passing an electric current through the water. This process for separating hydrogen from water is conventionally known in the art. However, the electric current required for this operation is typically generated by electric power plants which themselves typically generate pollutants. Thus, the methods utilized in the art for generating hydrogen gas result in undesired environmental pollution. An alternative solution for generating the required electric current for the hydrogen separation process is the use of solar-generated electric current. However, solar cells typically require large surface areas and therefore suffer from the drawback that such large solar arrays are difficult to fabricate, store, maintain, and operate. Furthermore, large-area solar arrays suffer from large structural loads due to wind, snow, rain, and other environmental factors; and even if large-area arrays are utilized for generating the electric current required to separate hydrogen from water, the water must be transported to the array at great expense, or the electric current from the solar array must be transmitted to the source of water. Such electric transmission would necessarily result in ohmic losses due to the resistance of the transmission medium (for example, the electrical conductors and contacts), thereby reducing the efficiency of production. Such large arrays also lack portability, thus any such installation would necessarily suffer from the high cost of transporting the array should it be desired to do so.

Other patents and printed patent application publications disclose various aspects of the prior art of separating hydrogen from water, especially seawater. These are:

US2002/0005360 A1 to Haug et al., filing date Feb. 14, 2001;

2) US202/0060161 A1 to Roe et al., filing date Jan. 31, 2001;

3) U.S. Pat. No. 4,011,149 to Nozik, filing date Nov. 17, 1975;

4) U.S. Pat. No. 4,021,323 to Kilbey et al., filing date Jul. 28, 1975;

5) U.S. Pat. No. 4,045,546 to DuPont, filing date Aug. 6, 1976;

6) U.S. Pat. No. 4,061,555 to Miyantani et al., filing date Jan. 19, 1977;

7) U.S. Pat. No. 4,076,904 to Chen, filing date Nov. 11, 1976;

8) U.S. Pat. No. 4,090,933 to Nozik, filing date Nov. 26, 1976;

9) U.S. Pat. No. 4,094,751 to Nozik, filing date Sep. 30, 1976;

10) U.S. Pat. No. 4,160,816 to Williams et al., filing date Dec. 5, 1977;

11) U.S. Pat. No. 4,236,984 to Grantham, filing date Nov. 21, 1979;

12) U.S. Pat. No. 4,263,111 to Hooper et al., filing date Dec. 17, 1979;

13) U.S. Pat. No. 4,305,794 to Davidson et al., filing date Apr. 18, 1979

14) U.S. Pat. No. 4,310,405 to Heller, filing date Sep. 23, 1980;

15) U.S. Pat. No. 4,379,740 to Nazzal et al., filing date Jun. 21, 1982;

16) U.S. Pat. No. 4,381,978 to Gratzel et al., filing date Aug. 14, 1981;

17) U.S. Pat. No. 4,414,080 to Williams et al., filing date May 10, 1982;

18) U.S. Pat. No. 4,419,329 to Heller, filing date Apr. 15, 1982;

19) U.S. Pat. No. 4,528,252 to Yamazaki, filing date Mar. 28, 1983;

20) U.S. Pat. No. 4,643,817 to Appleby, filing date Jun. 7, 1985;

21) U.S. Pat. No. 4,656,103 to Reichman et al., filing date May 20, 19851
22) U.S. Pat. No. 4,709,916 to Murphy et al., filing date Aug. 18, 1987;
23) JP 8-290052 to Shinichi et al., filing date November 1996;
24) US 2002/0155330 A1 to Tanaka, filing date February 2002;
25) US 2004/0009392 A1 to Petillo et al., filing date April 2003;
26) U.S. Pat. No. 3,917,520 to Katz et al., filing date November 1974;
27) U.S. Pat. No. 4,107,008 to Horvath, filing date December 1976;
28) U.S. Pat. No. 4,203,814 to Grantham, filing date November 1978;
29) U.S. Pat. No. 4,227,977 to Grantham, filing date August 1979;
30) U.S. Pat. No. 4,235,694 to Hall, filing date October 1978;
31) U.S. Pat. No. 4,236,984 to Grantham, filing date November 1979;
32) U.S. Pat. No. 4,263,110 to Meyerand, Jr., filing date December 1979;
33) U.S. Pat. No. 4,263,111 to Hooper et al., filing date December 1979;
34) U.S. Pat. No. 4,394,231 to Nicolas, filing date August 19981;
35) U.S. Pat. No. 4,412,895 to Lu, filing date September 1981;
36) U.S. Pat. No. 4,466,869 to Ayers, filing date August 1983;
37) U.S. Pat. No. 5,037,518 to Young et al., filing date September 1989;
38) U.S. Pat. No. 5,540,831 to Klein, filing date April 1995;
39) U.S. Pat. No. 5,665,211 to Leppanen et al., filing date August 1993;
40) IS 6,533,919 B1 to Narayanan et al., filing date October 2000;
41) WO 94/05830 to Leppanen et al., filing date August 1993;
42) U.S. Pat. No. 4,235,693 to Rowe et al., filing date November 1979;
43) U.S. Pat. No. 4,352,722 to Ohkawa, filing date March 1981;
44) U.S. Pat. No. 4,472,260 to Neefe, filing date December 1982;
45) U.S. Pat. No. 4,490,232 to Lapeyre, filing date February 1984;
46) U.S. Pat. No. 4,511,450 to Neefe, filing date March 1984;
47) U.S. Pat. No. 4,522,695 to Neefe, filing date April 1984;
48) U.S. Pat. No. 4,565,617 to Ahuja, filing date December 1981;
49) U.S. Pat. No. 4,643,817 to Appleby, filing date June 1985;
50) U.S. Pat. No. 4,650,554 to Gordon, filing date October 1985;
51) U.S. Pat. No. 5,228,964 to Middleby, filing date February 1992;
52) U.S. Pat. No. 5,059,296 to Sherman, filing date September 1990;
53) DE 39 32 895 A1 to Kranz, filing date April 1990
54) O 458 737 A2 to Mandrin date November 1991;
55) PT 101752 A to De Sa Pinto, filing date September 1997;
56) US 202/0130051 A1 to Haug et al., filing date February 2002;
57) U.S. Pat. No. 3,256,504 to Fidelman, filing date January 1961;
58) U.S. Pat. No. 3,374,158 to Lord et al., filing date April 1964;
59) U.S. Pat. No. 3,840,454 to Jansta et al., filing date August 1972;
60) U.S. Pat. No. 4,146,446 to von Sturm, filing date October 1977;
61) U.S. Pat. No. 4,235,863 to Schulten et al., filing date February 1979;
62) U.S. Pat. No. 4,265,721 to Hackmyer, filing date May 1980;
63) U.S. Pat. No. 4,342,738 to Burgund, filing date August 1981;
64) U.S. Pat. No. 4,344,831 to Weber, filing date September 1980;
65) U.S. Pat. No. 4,371,500 to Papineau, filing date August 1980;
66) U.S. Pat. No. 4,394,293 to Gratzel et al., filing date September 1980;
67) U.S. Pat. No. 4,437,963 to Yeoman, filing date September 1981;
68) U.S. Pat. No. 4,588,577 to Cardinal, filing date March 1985;
69) U.S. Pat. No. 5,089,107 to Pacheco, filing date July 1990;
70) U.S. Pat. No. 5,176,809 to Simuni, filing date March 1990;
71) U.S. Pat. No. 5,300,276 to Ueda et al., filing date April 1992;
72) U.S. Pat. No. 5,401,371 to Oshima et al., filing date July 1993;
73) U.S. Pat. No. 5,632,870 to Kucherov, filing date April 1995;
74) U.S. Pat. No. 5,968,325 to Oloman et al., filing date January 1997;
75) U.S. Pat. No. 6,336,430 B2 to de Souza, et al., filing date June 1998;
76) JP368791 to Takayuki, filing date March 1991; and
77) JP2000-192275 to Mutsuki, filing date July 2000.

There is therefore a need for an apparatus and associated method for generating, storing, transporting, and using gaseous hydrogen in hydrogen fuel cells which is simple to use, safe, low in cost, and which is applicable for use in commercial hydrogen fuel cell applications. Furthermore, a need exists for the generation of hydrogen gas that utilizes an inexpensive and renewable source of energy, so that the cost of generating hydrogen gas is minimized, and so that the benefits of hydrogen fuel cell technology are not offset by the waste products produced in generating the hydrogen gas.

The apparatus and method disclosed in the present application overcome the drawbacks of the current technology. Solar energy, a renewable and free source of energy, is utilized to generate the necessary electric current used for separating hydrogen from water. While any source of water may be used, salt water is preferred. The apparatus is configured such that it is small enough to be easily transportable; it floats in a pool, pond, or other body of water; it utilizes solar energy to generate the electric current required to separate hydrogen from water; and the hydrogen is stored in a zeolite rod that is easily removable, storable, and usable in fuel cells. The drawbacks of the prior art are thus overcome by the features and elements of the present invention.

All patents, patent applications and publications discussed or cited herein are incorporated by reference to the same extent as if each individual publication or patent application was specifically and individually set forth in its entirety.

SUMMARY

The present invention relates to an apparatus for production, recovery and storage of hydrogen gas from an aqueous medium. The apparatus comprises a photovoltaic cell having a lens, an anode portion and a cathode portion, a conductive canister comprising a top portion having inner walls defining a cell chamber for housing a base of the photovoltaic cell and a bottom portion having a plurality of side openings for allowing passage of the aqueous medium, the conductive canister having an open top end disposed opposite an open bottom end, wherein the walls of the cell chamber are in communication with the anode portion of the photovoltaic cell, a removable floatation collar for vertically floating said apparatus with only said lens of said photovoltaic cell above the water line of said aqueous medium, a non-conductive top washer having a central aperture, the non-conductive top washer disposed along the underside of the photovoltaic cell, a removable hydrogen absorption rod comprising a zeolite core material capable of hydrogen absorption disposed on the surface of a conductive rod, the conductive rod having a top end and a bottom end, the top end of the conductive rod being in communication with the cathode portion of the photovoltaic cell as the conductive rod is passed through the central aperture of the non-conductive top washer, and a removable non-conductive bottom end cap attached to the open bottom end of the conductive canister, the removable non-conductive bottom end cap being in communication with the hydrogen absorption rod.

The present invention further relates to a method of producing, recovering and storing hydrogen gas from an aqueous medium, comprising the steps of: providing an apparatus capable of producing, recovering and storing hydrogen gas from an aqueous medium, vertically floating the apparatus in the aqueous medium with only a lens portion of a photovoltaic cell being above the water line of the aqueous medium, exposing the apparatus to a light source capable of generating an electric current in the photovoltaic cell, the electric current being used to power electrolysis of the aqueous medium, recovering and storing the hydrogen gas released via electrolysis of the aqueous medium wherein the hydrogen gas is captured in a hydrogen absorption rod comprising a zeolite core material disposed on the surface of a conductive rod, removing the hydrogen absorption rod from the apparatus, and utilizing the hydrogen absorption rod to power a hydrogen fuel cell, wherein the hydrogen gas captured in the zeolite core material of the hydrogen absorption rod is released to the hydrogen fuel cell.

DETAILED DESCRIPTION

Figure 1:
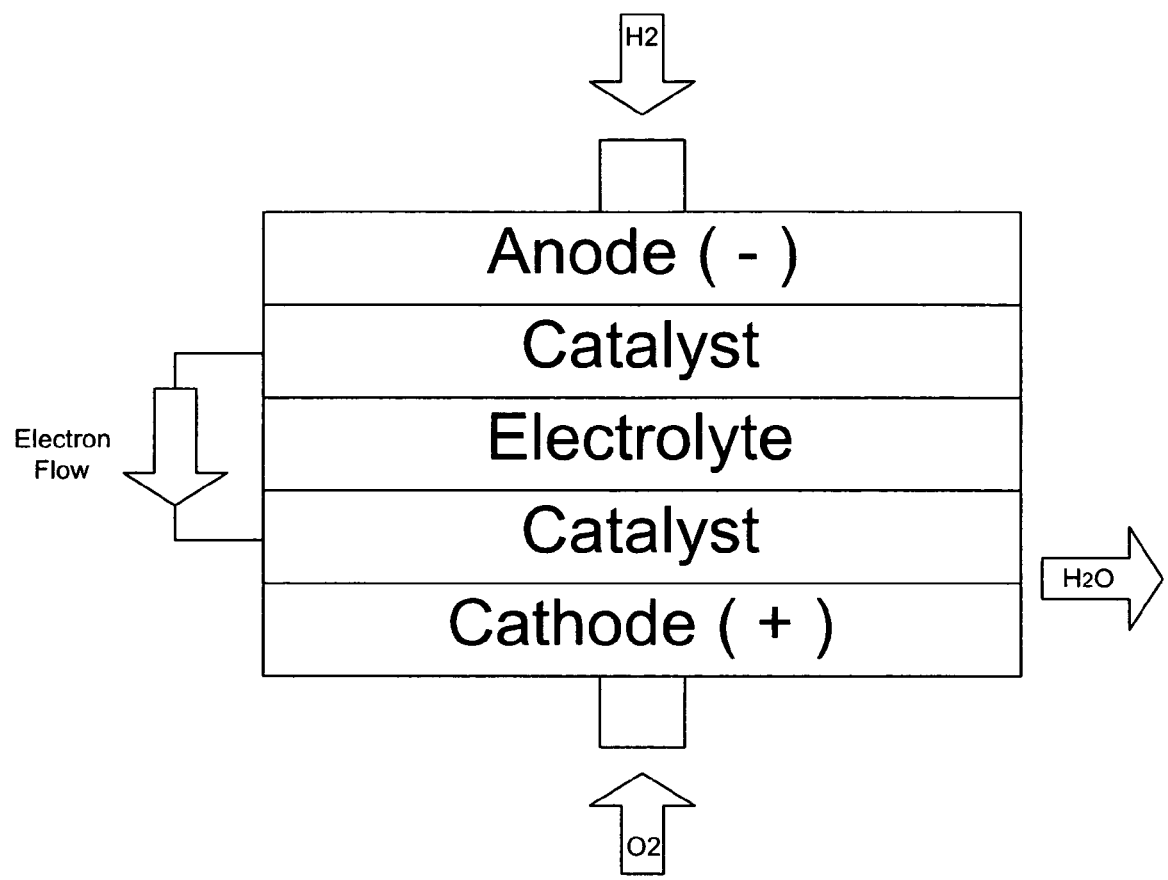
FIG. 1 is a schematic view of a typical hydrogen fuel cell.

The invention is directed to an apparatus and a method for producing, capturing and storing hydrogen in a hydrogen absorption rod comprising zeolite core material grown on the surface of a conductive rod, the zeolite core material being suitable for use in storing captured hydrogen for later use in a hydrogen fuel cell. More specifically, the apparatus and method utilize solar-generated electric current to separate hydrogen from water, preferably salt water, whereupon the hydrogen is captured in the zeolite core material of the hydrogen absorption rod. Thus, the hydrogen absorption rod is configured to allow for ease and safety of transportation, storage, and use of captured hydrogen in hydrogen fuel cells. The present invention provides the benefits of low cost, ease of use, reduced risk of injury, reduced risk of explosion and fire, and simplicity over the use of pressurized hydrogen for use in hydrogen fuel cells.

While the disclosure of the present invention refers to solar energy as the light energy source utilized to generate the electric current in the photovoltaic cell, any appropriate light source which generates electric current in the photovoltaic cell may be used. Such sources of light may be natural or artificial.

In the disclosure of the present invention, the term "aqueous medium" refers to any solution wherein water is the solvent. Usable aqueous mediums include, but are not limited to, fresh water and salt water sources being either man-made or naturally occurring. Salt water is preferred due to its naturally conductive properties; however, fresh water may be used as a less efficient alternative. Further, due to excessive carbon dumping in the oceans it has been observed that surface areas of the oceans are becoming excessively enriched in hydrogen, which adversely affects surrounding sea life. The present invention serves to help alleviate such adverse effects when the apparatus is utilized in such hydrogen enriched sea water.

Photovoltaic cells (solar cells), specifically flat array photovoltaic cells comprised of semiconductor junctions, are known in the art and are currently utilized to generate an electric current from solar energy. Such photovoltaic cells have been widely described in the prior art. In contrast to the prior art, a unique photovoltaic cell that utilizes light transmitting particles acting as waveguides has been previously disclosed by applicant in several patent applications: U.S. provisional application No. 60/783,638 filed on Mar. 17, 2006, and PCT application number PCT/US2006/015762 filed on Apr. 25, 2006 and claiming a priority date of Mar. 17, 2006. Applicant is the sole inventor of both prior applications. Both prior applications are hereby incorporated by reference in their entirety. The photovoltaic cells disclosed in these two patent applications are multi-layer photovoltaic devices which incorporate light transmitting particles in the semiconductor material of the N and P layers, allowing light to be transmitted through, as well as absorbed by, each successive layer. The light transmitting materials include, but are not limited to, crystals of the type defined as optical calcite, tumbled clear or colored quartz, clear ulexite, clear Herkimer diamond, diamond, danburite, kunzite or optically clear glass. It is an aspect of the invention that any light transmitting material suitable for use in the photovoltaic cell manufacturing process is included within the scope of this disclosure, without regard to any specific index of transmissivity or refraction. In this manner, photovoltaic cells of reduced surface area are fabricated, with the advantage of generating more electric current per unit area than traditional flat solar arrays.

Figure 2:
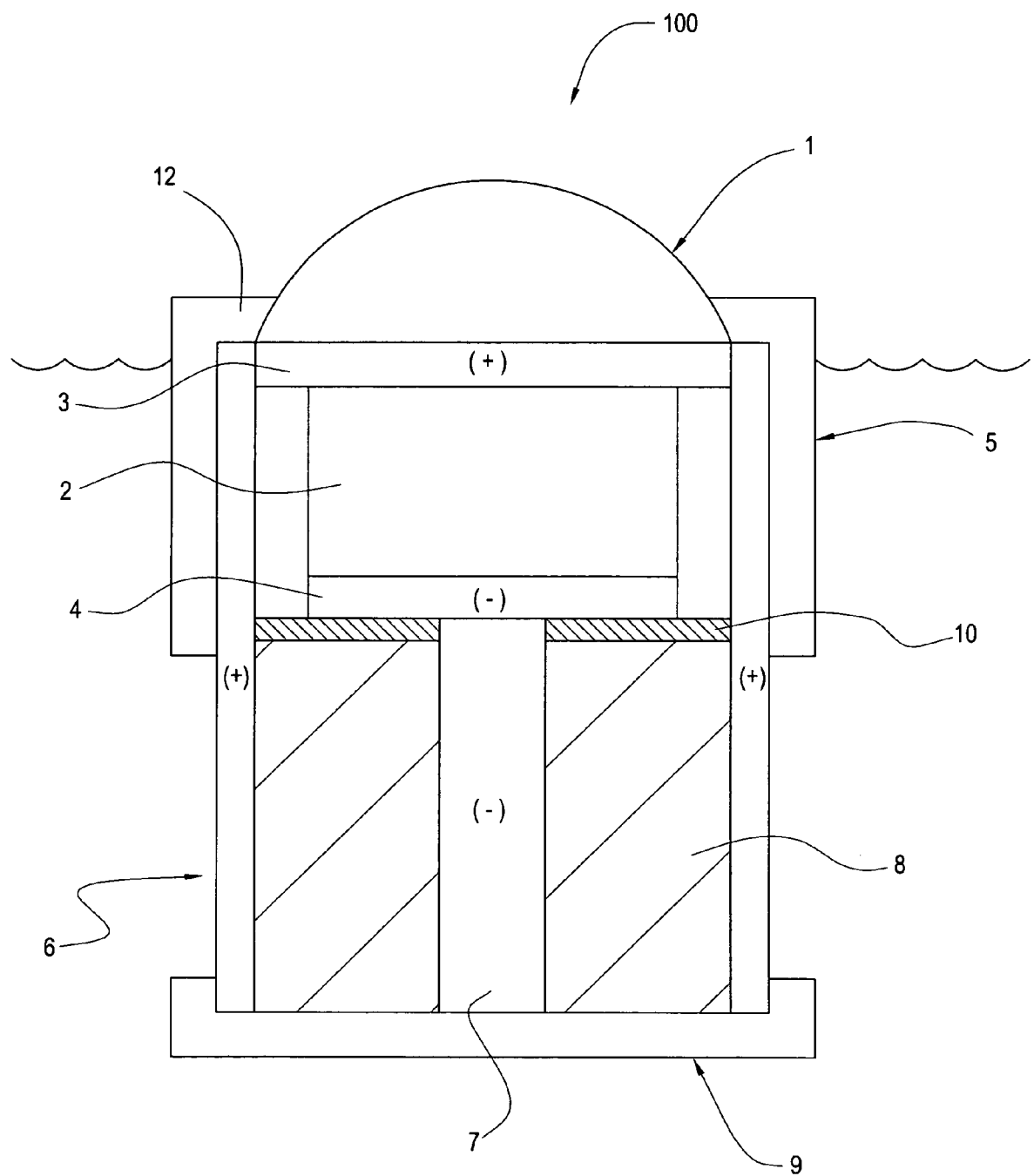
FIG. 2 is a cutaway view of the apparatus of the present invention.
Figure 3:
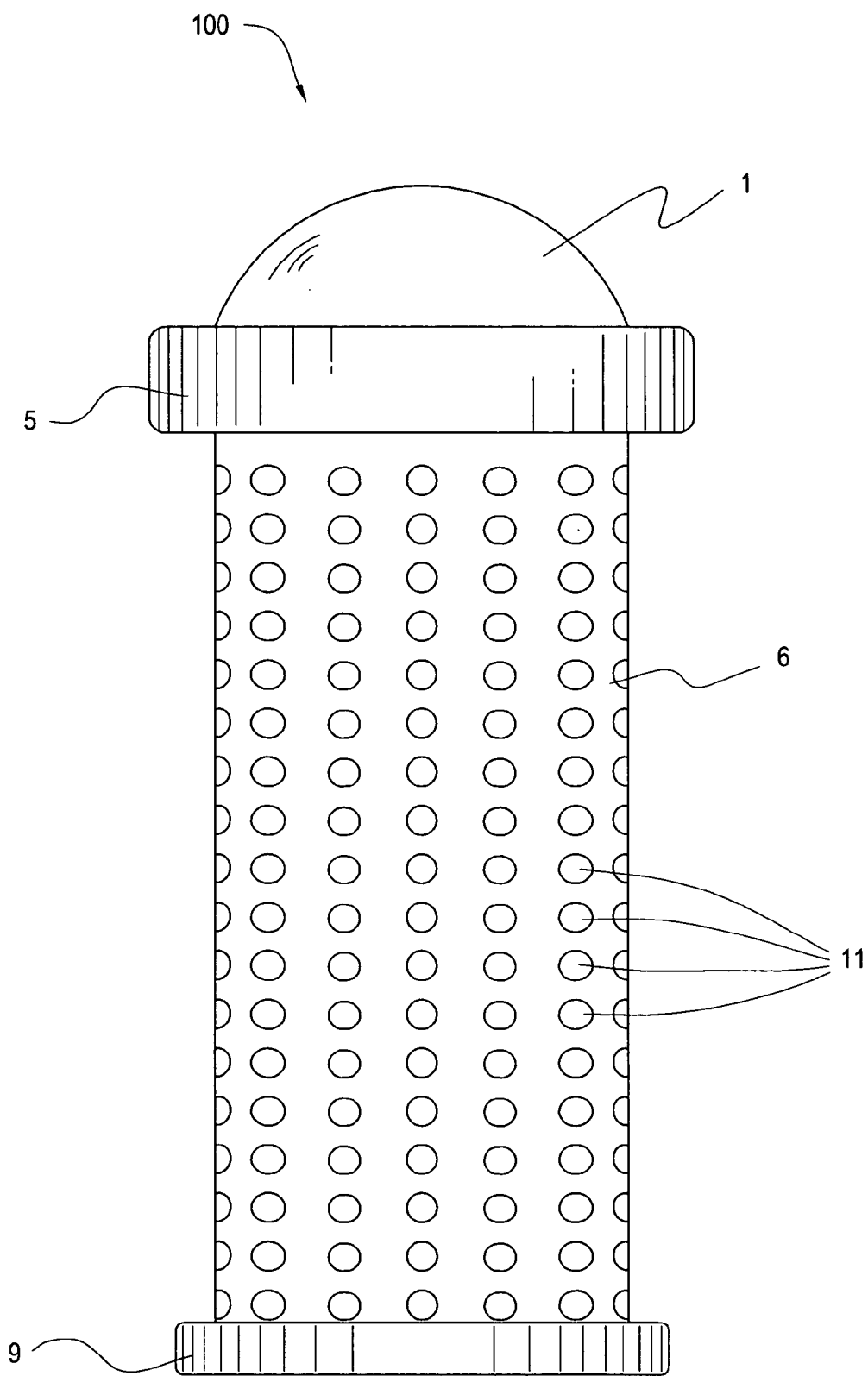
FIG. 3 is a perspective view of the apparatus of the present invention.

As depicted in FIG. 2 and FIG. 3, an apparatus 100 of the current invention utilizes a lens 1, applicant's multi-layer light transmitting photovoltaic cell 2 having a top conductive ring 3 at a top anode position and a bottom conductive plug 4 at a bottom cathode position, a removable flotation collar 5 having an upper ridge 12, a conductive canister 6 having side openings 11, a conductive rod 7 encompassed by a zeolite core material 8, a non-conductive bottom end cap 9, and a non-conductive top washer 10 wherein the apparatus 100 is configured to float at the surface of an aqueous medium. The photovoltaic cell 2 converts solar energy (sunlight) to electric current, which is utilized to separate hydrogen from the aqueous medium in which the apparatus 100 is floating. The hydrogen thus generated is stored in the hydrogen absorption rod comprising the zeolite core material 8 surrounding the conductive rod 7. The hydrogen absorption rod is easy to remove and replace, and is usable for insertion into a hydrogen fuel cell 13 (see FIG. 5) after it is removed from the apparatus 100 of the present invention. In this manner, hydrogen is separated from water using solar-generated electric current, and the hydrogen is stored in the zeolite core material 8 of the hydrogen absorption rod, which is replaceable and reusable in hydrogen fuel cells 13.

Lens 1 is attached such that it is in physical contact with a first surface of the photovoltaic cell 2 as shown in FIG. 2. Lens 1 may be comprised of any of the class of materials transmissive to light including, but not limited to, clear plastic, glass, crystal or any other light transmissive material, and may be a fresnel lens, a shaped lens such as a convex lens, a tall lens, a flat lens, or a collimating lens. A lens 1, such as a collimating lens, provides the beneficial capability of drawing more light into the orifice than if a flat lens had been used.

Figure 4:
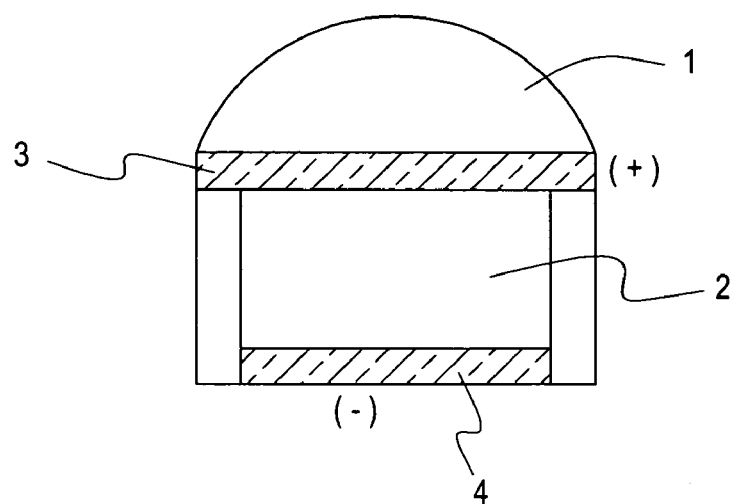
FIG. 4 is a cutaway view of the photovoltaic cell in the apparatus of the present invention.

The present invention may incorporate applicant's multi-layer photovoltaic cells 2 which incorporate light transmitting particles in the semiconductor material of the N and P layers, allowing light to be transmitted through, as well as absorbed by, each successive layer. In this manner, photovoltaic cells of reduced surface area are fabricated, with the advantage of generating more electric current per unit area than traditional flat solar arrays. Semiconductor materials comprising the photovoltaic cells 2 of the present invention are selected from semiconductors known by one of ordinary skill in the art to be utilized in photovoltaic cell fabrication including, but not limited to, Se, Si, $TiO_2$, Ru, Ga, As, Ni, Te, Cd, S, C, In, Pt, Cu, Al, B, Sb, Be, Ca, Cr, Au, I, Ir, Li, Mg, Mo, Pd, P, K, Rh, Ag, Na, Ta, Sn, Zn, Ge, GaAs, GaNi, CdTe, CdS, and CdSe, but optimally are CdTe. Alternatively, conventional photovoltaic cells 2 known to one of ordinary skill in the art may be incorporated as a less efficient alternative. As depicted in FIG. 4, a photovoltaic cell 2 of the present invention has a top conductive ring 3 at a top anode position and a bottom conductive plug 4 at a bottom cathode position. Such a top conductive ring 3 and a bottom conductive plug 4 are composed of any electrically conductive material, such as but not limited to, copper.

Conductive canister 6 comprises a top portion defining a cell chamber for housing a photovoltaic cell 2 and a bottom portion having a plurality of side openings 11. Conductive canister 6 comprises a thin porous screen in physical contact with the top conductive ring 3 at a top anode position of the photovoltaic cell 2. Thus, the conductive canister 6 represents an anode in the apparatus 100 of the present invention. The plurality of side openings 11 within conductive canister 6 allows the passage of aqueous medium therein accessing the zeolite core material 8 of the hydrogen absorption rod. Thus, the lower portion of conductive canister 6 encompasses the hydrogen absorption rod comprised of the conductive rod 7 and its coating of zeolite core material 8. The conductive canister 6 may be composed of any conductive material including, but not limited to, titanium and aluminum.

Removable floatation collar 5 maintains the apparatus 100 floating in a vertical position with only the lens 1 above the water line of the aqueous medium. Floatation collar 5 functions to hold photovoltaic cell 2 in position within the cell chamber of the conductive canister 6. As depicted in FIG. 2, an upper ridge 12 abutting lens 1 may be incorporated onto flotation collar 5 to provide an enhanced watertight seal that protects the photovoltaic cell 2, top conductive ring 3, and bottom conductive plug 4 from water damage. The flotation collar 5 may be composed of any resilient and buoyant material including, but not limited to, rubber.

A non-conductive top washer 10 having a central aperture is disposed beneath the bottom conductive plug 4 of photovoltaic cell 2. Top washer 10 functions to provide a watertight seal along its entire periphery, which is in contact with conductive canister 6. Such a seal prevents water from reaching and damaging the photovoltaic cell 2, top conductive ring 3, and bottom conductive plug 4. The seal may be formed in a variety of means, including but not limited to, a glue disposed around the contact points between top washer 10 and conductive canister 6 and/or the natural resilient characteristics of the materials composing top washer 10. Top washer 10 may be composed of any non-conductive material including, but not limited to, rubber.

Zeolite materials are known in the art, and have previously been utilized in the fossil fuel refining industry for various purposes, including but not limited to, the hydrocracking process. The definition, chemical composition, use, and variants of zeolite material is described in the publication *Zeolites for Cleaner Technologies* (Michel Guinet and Jean-Pierre Gilson, *Zeolites for Cleaner Technologies* (Imperial College Press 2002)), which is hereby incorporated by reference in its entirety. Zeolite materials have the ability to absorb and capture gaseous materials. Synthetic zeolite materials may be fabricated which are specifically designed to absorb and capture hydrogen gas.

The present invention features a hydrogen absorption rod comprising a zeolite core material 8 disposed on the surface of a conductive rod 7. The conductive rod 7 serves as the foundation for growth of the zeolite core material 8. The zeolite core material 8 is responsible for capturing and storing the hydrogen gas released via electrolysis of the surrounding aqueous medium.

The hydrogen absorption rod is disposed along the central axis of the apparatus 100. The bottom conductive plug 4 is in direct physical contact with the conductive rod 7 of the hydrogen absorption rod when the conductive rod 7 is passed through the central aperture of the non-conductive top washer 10. Thus, the conductive rod 7 represents a cathode in the apparatus 100 of the present invention. Non-conductive top washer 10 forms a watertight seal with the conductive rod 7, when the conductive rod 7 is passed through the central aperture of top washer 10. This serves to preserve and protect the photovoltaic cell 2, top conductive ring 3, and bottom conductive plug 4 from water damage. The conductive rod 7 may be composed of any conductive material including, but not limited to, titanium and aluminum.

Zeolite core material 8 is disposed on the outer surface of the conductive rod 7, thus forming the hydrogen absorption rod. The zeolite core material 8 functions to capture hydrogen released during the electrolysis of the surrounding aqueous medium, which is preferably salt water. Zeolite core material 8 of the present invention comprises material incorporating nanoparticles of a platinum group metal, preferably palladium. Palladium and the other platinum group metals are capable of absorbing 900 times their volume in hydrogen, and when filled they release the excess hydrogen into the zeolite cavities. Any conventional means known to one of ordinary skill in the art may be used to incorporate the zeolite core material 8 onto the outer surface of the conductive rod 7. One such process includes dipping the conductive rod 7 into a vat of liquid zeolite material containing nanoparticles of a platinum group metal. During such a dipping process, the zeolite core material 8 is allowed to crystallize onto the outer surface of the conductive rod 7. Additionally, the zeolite core material 8 may be dyed to indicate when it has reached its maximum capacity for storing hydrogen, and is thus ready to be removed from the aqueous medium. Under the scope of the present invention, the zeolite core material 8 may alternatively be substituted with carbon nanotubes or carbon nanocages for capturing the released hydrogen gas.

The removable non-conductive bottom end cap 9 of apparatus 100 functions to cap the open bottom end of the conductive canister 6. Bottom end cap 9 is also in communication with the hydrogen absorption rod within the apparatus 100. The bottom end cap 9 may be composed of any non-conductive material including, but not limited to, rubber. When bottom end cap 9 is removed, the hydrogen absorption rod is capable of being extracted from the apparatus 100. After capturing and storing hydrogen, the hydrogen absorption rod is removed from apparatus 100 and is then ready for use in a hydrogen fuel cell 13.

The present invention is also directed to a method of producing, recovering and storing hydrogen gas from an aqueous medium. An apparatus 100 capable of producing, recovering and storing hydrogen gas from an aqueous medium is provided, as disclosed above. Apparatus 100 is vertically floated in the aqueous medium with only a lens 1 portion of a photovoltaic cell 2 being above the water line of the aqueous medium. A light source capable of generating an electric current in the photovoltaic cell 2 is exposed to the apparatus 100, the generated electric current is used to power electrolysis of the aqueous medium. Hydrogen is released by electrolysis of the surrounding aqueous medium and hydrogen bubbling away from apparatus 100 is captured and stored in hydrogen absorption rod comprising a zeolite core material 8 disposed on the surface of a conductive rod 7. The now hydrogen-enriched hydrogen absorption rod is removed from the apparatus 100.

Figure 5:
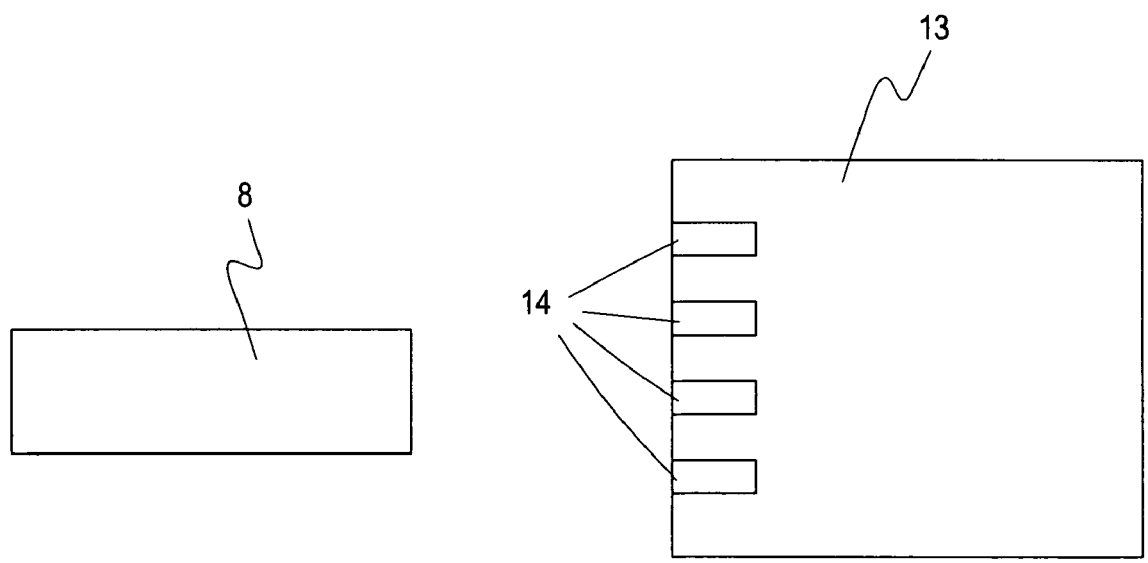
FIG. 5 depicts a hydrogen-enriched hydrogen absorption rod having been removed from the apparatus of the present invention and being ready for use in a hydrogen fuel cell capable of accepting one or more hydrogen absorption rods for releasing and utilization of the captured hydrogen gas.

The hydrogen absorption rod may now be used to power a hydrogen fuel cell 13, wherein the hydrogen gas captured in the zeolite core material 8 of the hydrogen absorption rod is released to the hydrogen fuel cell 13 (see FIG. 5). Such hydrogen fuel cells 13 may utilize one or more hydrogen absorption rods and thus may include one or more access ports 14 within the hydrogen fuel cell 13. Apparatus 100 may then be reassembled with a now hydrogen-depleted zeolite core material 8 disposed on the conductive rod 7 of the hydrogen absorption rod allowing for repeated production, recovery and storage of hydrogen gas from the surrounding aqueous medium.

In a more detailed description of use, an apparatus 100 comprising a removable flotation collar 5 vertically floats in a surrounding aqueous medium while flotation collar 5 maintains only a lens 1 portion above the water line of the surrounding aqueous medium. Lens 1 covers a photovoltaic cell 2 that is exposed to a light energy source sufficient to generate an electric current in the photovoltaic cell 2. The generated electric potential is utilized to separate hydrogen from the surrounding aqueous medium via electrolysis. A top conductive ring 3 in direct physical contact with a conductive canister 6 represents the anode of the apparatus 100. A bottom conductive plug 4 in direct physical contact with a conductive rod 7 represents the cathode of the apparatus 100. When anode (−) and cathode (+) become saturated with oxygen and hydrogen, respectively, the excess oxygen and hydrogen are bubbled off. During electrolysis, oxygen bubbles off of the anode of apparatus 100 and the oxygen then goes back into the surrounding aqueous medium. Hydrogen bubbling off the cathode of the apparatus 100 is captured by a hydrogen absorption rod comprising a zeolite core material 8 containing nanoparticles of a platinum group metal that has been crystallized onto the surface of the conductive rod 7. The hydrogen is retained by the zeolite cages and the platinum group metals of the zeolite core material 8. Platinum group metals, such as palladium, are capable of absorbing 900 time their weight in hydrogen. Flotation collar 5 further functions to securely hold lens 1, photovoltaic cell 2 and conductive canister 6 together with a watertight seal. A non-conductive top washer 10 having a central aperture also functions to form a watertight seal at its periphery in contact with conductive canister 6 and forms another watertight seal around its central aperture when conductive rod 7 is passed therein. Such watertight seals serve to protect the photovoltaic cell 2, top conductive ring 3, and bottom conductive plug 4 from water damage. A removable non-conductive bottom end cap 9 functions to close the open bottom end of the conductive canister 6 and also serves to retain the hydrogen absorption rod within the apparatus 100.

When the zeolite core material 8 has captured a sufficient amount of hydrogen, the apparatus 100 is retrieved from the aqueous medium. The bottom end cap 9 is removed from the bottom open end of conductive canister 6 and the hydrogen absorption rod is then removed from the apparatus 100. The hydrogen absorption rod is then ready to be inserted into a hydrogen fuel cell 13 having one or more access ports 14 and capable or receiving one or more hydrogen absorption rods (see FIG. 5). In such a manner, multiple hydrogen absorption rods may be used in a hydrogen fuel cell 13. Fuel cell 13 may heat the zeolite core material 8 to release the hydrogen captured therein. When the hydrogen within the zeolite core material 8 has been depleted, the hydrogen absorption rod is removed from the fuel cell 13. Apparatus 100 can then be reassembled with the hydrogen-depleted hydrogen absorption rod, allowing reuse and repeated production, recovery and storage of hydrogen gas from aqueous medium.

All patent application publications, patents, and other printed publications listed above are hereby incorporated by reference in their entirety.

It should be understood that the examples and embodiments described herein are for illustrative purposes only and that various modifications or changes in light thereof will be suggested to persons skilled in the art and are to be included within the spirit and purview of this application and the scope of the appended claims.

What is claimed is:

1. An apparatus for production, recovery and storage of hydrogen gas from an aqueous medium, said apparatus comprising:
   a photovoltaic cell having a lens, an anode portion and a cathode portion;
   a conductive canister comprising a top portion having inner walls defining a cell chamber for housing a base of said photovoltaic cell and a bottom portion having a plurality of side openings for allowing passage of said aqueous medium, said conductive canister having an open top end disposed opposite an open bottom end, wherein said inner walls of said cell chamber are in communication with said anode portion of said photovoltaic cell;

a removable floatation collar for vertically floating said apparatus with only said lens of said photovoltaic cell above the water line of said aqueous medium;

a non-conductive top washer having a central aperture, said non-conductive top washer disposed along the underside of said photovoltaic cell;

a removable hydrogen absorption rod comprising a zeolite core material capable of hydrogen absorption disposed on the surface of a conductive rod, said conductive rod having a top end and a bottom end, said top end of said conductive rod being in communication with said cathode portion of said photovoltaic cell as said conductive rod is passed through said central aperture of said non-conductive top washer; and a removable non-conductive bottom end cap attached to said open bottom end of said conductive canister, said removable non-conductive bottom end cap being in communication with said hydrogen absorption rod, wherein said hydrogen absorption rod is capable of being removed from said apparatus when said bottom end cap is removed from said open bottom end of said conductive canister.

2. The apparatus of claim 1, wherein and said removable hydrogen absorption rod is disposed along the central axis of said apparatus.

3. The apparatus of claim 2, wherein said removable flotation collar encompasses said base of said photovoltaic cell and said open top end of said conductive canister in a watertight seal when said photovoltaic cell is disposed within said cell chamber of said conductive canister.

4. The apparatus of claim 3, wherein said non-conductive top washer forms a watertight seal with said inner walls of said cell chamber.

5. The apparatus of claim 4, wherein a watertight seal is formed when said conductive rod passes through said central aperture of said non-conductive top washer.

6. The apparatus of claim 5, wherein said conductive rod is composed of a material selected from the group consisting of titanium and aluminum.

7. The apparatus of claim 6, wherein said conductive canister is composed of material selected from the group consisting of titanium and aluminum.

8. The apparatus of claim 7, wherein said zeolite core material includes nanoparticles of a platinum group metal.

9. The apparatus of claim 8, wherein said photovoltaic cell is further formed in a multi-layer configuration that incorporates light transmitting particles in the semiconductor material of the N and P layers, allowing light to be transmitted through, as well as absorbed by, each successive layer.

10. The apparatus of claim 9, wherein said aqueous medium is salt water.

11. An apparatus for production, recovery and storage of hydrogen gas from an aqueous medium, said apparatus comprising:

a photovoltaic cell having a lens, a top conductive ring at a top anode and a bottom conductive plug at a bottom cathode;

a conductive canister comprising a top portion defining a cell chamber for housing a base of said photovoltaic cell and a bottom portion having a plurality of side openings for allowing passage of said aqueous medium, said conductive canister having an open top end disposed opposite an open bottom end, wherein said top end is in communication with said top conductive ring of said photovoltaic cell;

a removable floatation collar for vertically floating said apparatus with only said lens of said photovoltaic cell above the water line of said aqueous medium, said removable flotation collar encompassing said base of said photovoltaic cell and said open top end of said conductive canister in a watertight seal when said photovoltaic cell is disposed within said cell chamber of said conductive canister;

a non-conductive top washer having a central aperture, said non-conductive top washer disposed along the underside of said bottom conductive plug of said photovoltaic cell, periphery of said non-conductive top washer forming a watertight seal with said cell chamber;

a removable hydrogen absorption rod comprising a zeolite core material capable of hydrogen absorption disposed on the surface of a conductive rod, said conductive rod having a top end and a bottom end, said hydrogen absorption rod being disposed along the central axis of said apparatus, said top end of said conductive rod being in communication with said bottom conductive plug of said photovoltaic cell and a watertight seal being formed where said conductive rod passes through said central aperture of said non-conductive top washer; and a removable non-conductive bottom end cap attached to said open bottom end of said conductive canister, said removable non-conductive bottom end cap being in communication with said hydrogen absorption rod, wherein said hydrogen absorption rod is capable of being removed from said apparatus when said bottom end cap is removed from said open bottom end of said conductive canister.

12. The apparatus of claim 11, wherein said conductive rod is composed of a material selected from the group consisting of titanium and aluminum 13. The apparatus of claim 12, wherein said conductive canister is composed of a material selected from the group consisting of titanium and aluminum.

14. The apparatus of claim 13, wherein said zeolite core material includes nanoparticles of a platinum group metal.

15. The apparatus of claim 14, wherein said photovoltaic cell is further formed in a multi-layer configuration that incorporates light transmitting particles in the semiconductor material of the N and P layers, allowing light to be transmitted through, as well as absorbed by, each successive layer.

16. The apparatus of claim 15, wherein said aqueous medium is salt water.

17. A method of producing, recovering and storing hydrogen gas from an aqueous medium, comprising the steps of:

providing an apparatus capable of producing, recovering and storing hydrogen gas from an aqueous medium;

vertically floating said apparatus in said aqueous medium with only a lens portion of a photovoltaic cell being above the water line of said aqueous medium;

exposing said apparatus to a light source capable of generating an electric current in said photovoltaic cell, said electric current being used to power electrolysis of said aqueous medium;

recovering and storing said hydrogen gas released via electrolysis of said aqueous medium wherein said hydrogen gas is captured in a hydrogen absorption rod comprising a zeolite core material disposed on the surface of a conductive rod;

removing said hydrogen absorption rod from said apparatus; and utilizing said hydrogen absorption rod to power a hydrogen fuel cell, wherein said hydrogen gas captured in said zeolite core material of said hydrogen absorption rod is released to said hydrogen fuel cell.

18. The method of claim 17, further comprising the step of:

reassembling said apparatus using said hydrogen absorption rod that comprises said zeolite core material being hydrogen-depleted and capable of repeated production, recovery and storage of hydrogen gas from said aqueous medium.

19. The method of claim 18, wherein said photovoltaic cell is further formed in a multi-layer configuration that incorporates light transmitting particles in the semiconductor material of the N and P layers, allowing light to be transmitted through, as well as absorbed by, each successive layer.

20. The method of claim 19, wherein said aqueous medium is salt water.

* * * * *